US005662003A

United States Patent [19]

Ohara

[11] Patent Number: 5,662,003

[45] Date of Patent: Sep. 2, 1997

[54] STEERING WHEEL DEVICE EQUIPPED WITH STOPPER

[75] Inventor: Toshiya Ohara, Tokyo, Japan

[73] Assignee: Namco Limited, Tokyo, Japan

[21] Appl. No.: 367,160

[22] PCT Filed: Oct. 21, 1994

[86] PCT No.: PCT/JP94/01771

§ 371 Date: Apr. 5, 1995

§ 102(e) Date: Apr. 5, 1995

[30] Foreign Application Priority Data

Oct. 21, 1993 [JP] Japan .................................... 5-285641

[51] Int. Cl.[6] ................................ A63F 9/00; B62D 1/20

[52] U.S. Cl. ................................................ 74/498; 74/526

[58] Field of Search ........................... 74/498, 526, 411.5

[56] References Cited

U.S. PATENT DOCUMENTS 3,662,610 5/1972 Thoen ....................................... 74/526
5,070,741 12/1991 Ervin ......................................... 74/498

FOREIGN PATENT DOCUMENTS 3-41492 4/1991 Japan .
3-77577 4/1991 Japan .

*Primary Examiner*—Charles A. Marmor
*Assistant Examiner*—David M. Fenstermacher
*Attorney, Agent, or Firm*—Burns, Doane, Swecker & Mathis, L.L.P.

[57] ABSTRACT

A steering wheel device used for driving simulators or the like utilizing a steering wheel is designed so that when the steering wheel rotates, the steering wheel shaft and the stopper arm rotate. The auxiliary shaft then rotates in the opposite direction by the engagement of a first gear wheel and a second gear wheel so as to rotate the stopper. The number of teeth of the second gear wheel is greater than that of the first gear wheel so that the steering wheel makes more than one revolution. The stopper arm is designed to hit the stopper to limit the rotation range of the steering wheel. The rotation torque of the steering wheel acts only between the stopper and the stopper arm and not between the gear wheels. As a result, the load applied to both gear wheels decreases so as to increase their service life and eliminate the necessity to employ highly strengthened gear wheels.

5 Claims, 5 Drawing Sheets

Fig. 4
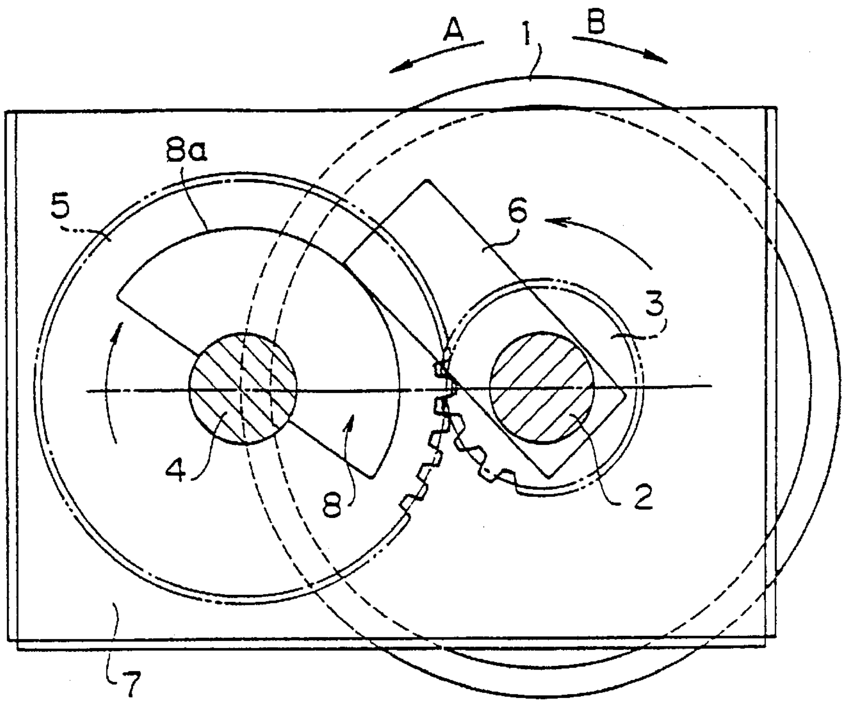
Fig. 5 - PRIOR ART
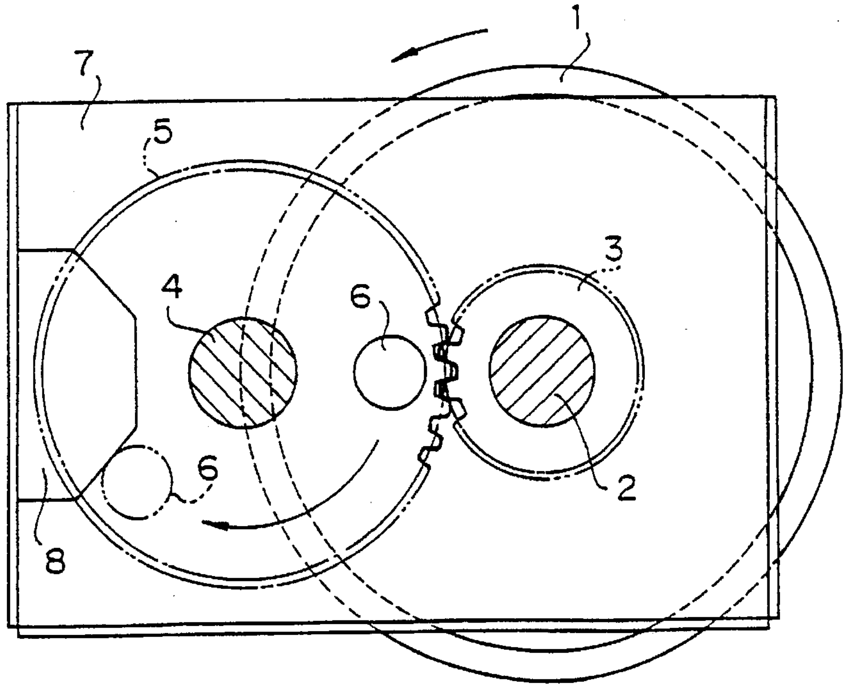

STEERING WHEEL DEVICE EQUIPPED WITH STOPPER

TECHNICAL FIELD

The present invention relates to a steering wheel device used for driving simulators or the like and more particularly a steering wheel device provided with a stopper function which prevents the steering wheel from being rotated over a certain acceptable limit.

BACKGROUND ART

In driving simulators, a driver holds a steering wheel and rotates it clockwise or counterclockwise for simulating driving. Driving simulators of this type have been known conventionally. Recently, these simulators adopt generally a structure in which the steering wheel can make one or more revolutions.

As such structure in which the steering wheel can make one or more revolutions, conventionally a structure shown in FIG. 5 is known wherein a first gear wheel 3 with a relatively small number of teeth is attached to a steering wheel shaft 2 to which a steering wheel 1 is fixed, a second gear wheel 5 with a relatively large number of teeth is attached to a auxiliary shaft 4 arranged parallel to the steering wheel shaft 2, and the first gear wheel 3 and the second gear wheel 5 are engaged to each other. In this structure, the steering wheel shaft 2, namely the steering wheel 1 can make one or more revolutions while the auxiliary shaft 4 makes one revolution. The rotation angle of one or more revolutions of the steering wheel 1 can be detected by detecting the rotation angle of one or less revolutions of the auxiliary shaft 4 by means of a detector using an encoding element or other detectors.

In these steering wheel devices, it is undesirable that the steering wheel 1 rotates freely, and thus the number of rotations of the steering wheel 1 is usually limited within a desired range. As conventional stopper mechanisms adopted for limiting the number of rotation of the steering wheel 1, a structure shown in FIG. 5 may be proposed wherein a stopper arm 6 extending perpendicularly to the plane of FIG. 5 is formed on the side of the second gear wheel 5 while a stopper 8 is fixed to a framework 7. In this stopper mechanism, when the second gear 5 rotates and the stopper arm 6 comes in contact with the stopper 8, further rotation of the second gear wheel 5, and hence the steering wheel 1 is inhibited.

Such conventional steering wheel devices present, however, the following drawbacks because both the stopper arm and the stopper are arranged on the auxiliary shaft side that is decelerated by a set of gear wheels. First, the torque applied to the auxiliary shaft 4 increases all the more during deceleration by gear wheels and, accordingly, the load applied to the stopper 8 and the stopper arm 6 may increase enormously and cause them to be broken. Second, the auxiliary shaft 4 may break easily because it is subject at the same time to the transmission load from the gear wheels 3 and 5 and to the reaction from the stopper 8. Finally, the gear wheels 3 and 5 also may break easily because they act directly as a stopper to restrict the rotation of the steering wheel shaft 2 and submit to an excessive transmission torque.

Thus, in conventional steering wheel devices, an excessive load is applied to respective members including gear wheels, stoppers, the auxiliary shaft, bearings supporting the auxiliary shaft or the like. Particularly, it would be necessary to increase the pitch diameter or width of gear wheels or to enlarge the module in order to compensate for the charge to the gear wheels, however, these countermeasures will provoke other drawbacks such as increased cost, loss of a smooth operation or the like.

Now, it is an object of the present invention to overcome the drawbacks mentioned above for the conventional steering wheel devices and more particularly, to reduce the charge on respective components, gear wheel elements to be specific, of a steering wheel device provided with a deceleration mechanism including gear wheels and with a stopper.

DISCLOSURE OF INVENTION

A steering wheel device according to the present invention comprises a steering wheel shaft integrated with the steering wheel, an auxiliary shaft arranged separately from the steering wheel shaft and a power transmission means interconnecting the steering wheel shaft and the auxiliary shaft such that the rotation angle of the steering wheel shaft be greater than the rotation angle of the auxiliary shaft, the device having a stopper arm which rotates in a body with the steering wheel shaft and a stopper which rotates in a body with the auxiliary shaft. Because the rotation locus of the stopper and the rotation locus of the stopper arm are intersecting each other, when the stopper and the stopper arm come to the intersection point at the same time, they abut each other so as to inhibit further rotation of the steering wheel. The stopper is arranged within an angular rotation range which constitutes a portion of its rotation locus to allow at least one revolution of the stopper arm which is disposed opposite to the stopper.

Gear wheel, chain, belt or other optionally selected power transmission element may be used as power transmission means interconnecting the steering wheel shaft and the auxiliary shaft. When gear wheels are adopted as the power transmission means, the number of teeth of the second gear wheel attached to the auxiliary shaft shall be greater than that of teeth of the first gear wheel attached to the steering wheel shaft such that the rotation angle of the steering wheel shaft be larger than that of the auxiliary shaft.

The main object of the stopper and the stopper arm is to inhibit the rotation of the steering wheel shaft and the auxiliary shaft or the rotation of the first and second gear wheels by coming into contact with each other, so their contact state is not limited to a certain state. Preferably, however, their positional relationship is determined so that the reaction generated between them when they come in contact with each other will be directed to the rotation center of the auxiliary shaft or to the rotation central axis line of the second gear wheel.

The configuration of the stopper is not limited to a specific one but, preferably, it is formed so that it will have an arcuate circumferential face of which center coincides with the rotation central axis line of the auxiliary shaft which is integrated with the stopper or with the rotation central axis line of the second gear wheel and that the stopper arm will come in contact with this circumferential surface and stop the rotation.

According to the steering wheel device of the present invention, the steering wheel shaft rotates with the steering wheel when the steering wheel rotates, its rotation is transmitted to the rotation central axis of the second gear wheel, namely to the auxiliary shaft by a power transmission means composed of the first and second gear wheels and others so as to rotate the auxiliary shaft. For example, as the number of teeth of the second gear wheel is determined greater than that of the first gear wheel, the steering wheel shaft, namely the steering wheel makes one or more revolutions before the second gear wheel, namely the auxiliary shaft makes one revolution. For instance, a wide range of angular rotation of one or more revolutions of the steering wheel shaft can be detected by arranging an angular rotation detection element, such as a potentiometer on the auxiliary shaft for detecting the rotation angle of one or less revolution relating to the auxiliary shaft.

The rotation restriction of the auxiliary shaft and the steering wheel shaft is realized by inhibiting further rotation when the stopper arm impinges against the stopper. When the rotation of the stopper arm is inhibited, the rotation of the steering wheel is inhibited directly and the rotation torque applied to the steering wheel will not be transmitted to the auxiliary shaft. In consequence, this torque act only between the stopper and the stopper arm and not between the first and the second gear wheels. As the result, the load charge onto the gear wheels decreases, so that various types of gears can be employed in the power transmission mechanism and that service life of the steering wheel device is prolonged.

BRIEF DESCRIPTION OF DRAWINGS

FIG. 4 is a front view of the steering wheel device of FIG. 1 in which the steering wheel stops the rotation;

FIG. 5 is a front view of an example of a conventional steering wheel device provided with stopper function;

BEST MODE FOR CARRYING OUT THE INVENTION

Now the present invention will be described more in detail making reference to the accompanied drawings.

Figure 1:
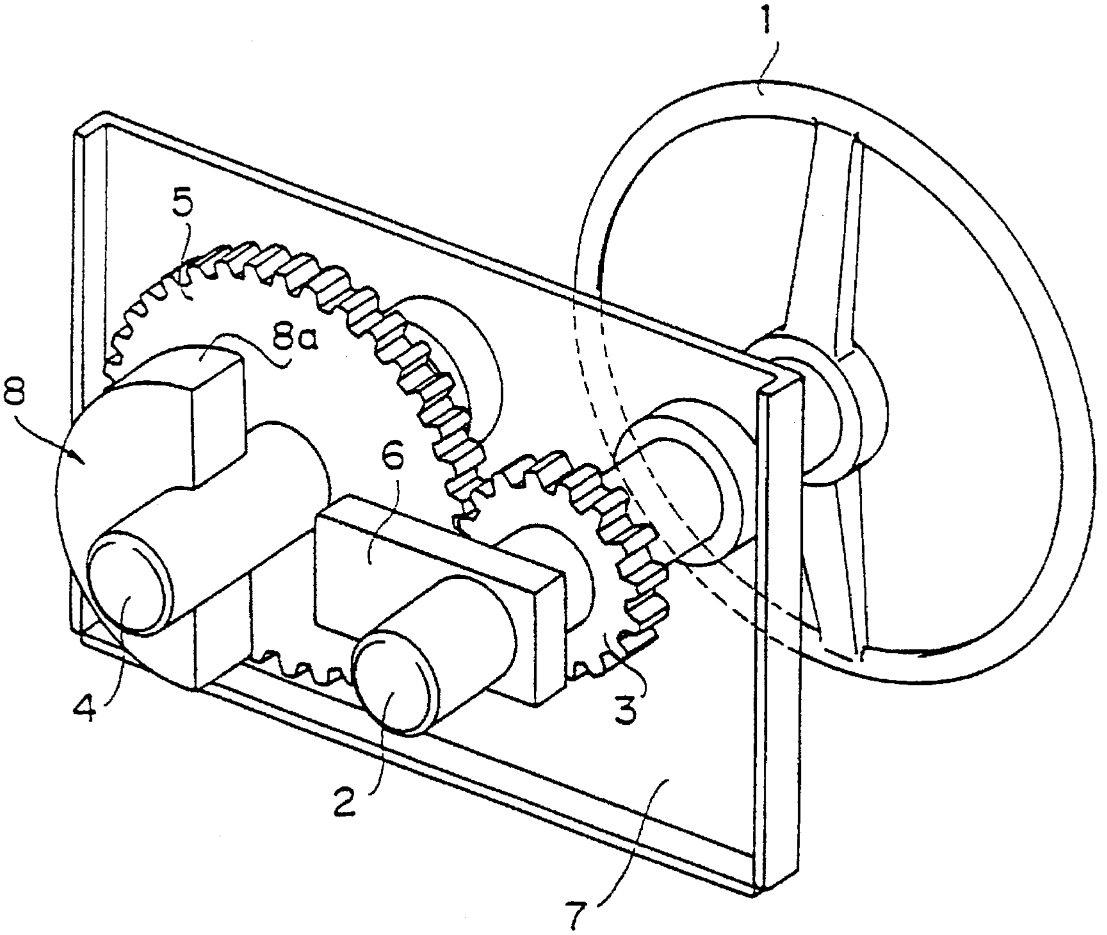
FIG. 1 is a perspective view of an embodiment of a steering wheel device according to the present invention.

FIG. 1 illustrates an embodiment of a steering wheel device according to the present invention. This steering wheel device comprises a steering wheel shaft 2 rotatably supported by a framework 7 and an auxiliary shaft 4 also rotatably supported by the framework 7. A steering wheel 1 is fixed to one end of the steering wheel shaft 2, a stopper arm 6 is fixed to the other end thereof and a first gear wheel 3 is fixed between the stopper arm 6 and the framework 7. A fan-shaped stopper 8 is fixed to the end of the auxiliary shaft 4 and a second gear wheel 5 is fixed between this stopper 8 and the framework 7. Alternatively, the stopper 8 and the stopper arm 6 may respectively be arranged on the side of the second gear wheel 5 and the first gear wheel 3.

The first gear wheel 3 and the second gear wheel 5 engage each other, and the number of teeth of the second gear wheel is set greater than that of the first gear wheel. The rotation locus of the stopper 8 around the auxiliary shaft 4 and the rotation locus of the stopper arm 6 around the steering wheel shaft 2 being arranged to intersect each other at a specific point between these two shafts. When the stopper 8 and the stopper arm 6 come to the specific point at the same time, they abut each other so as to inhibit further rotation thereof.

Figure 2:
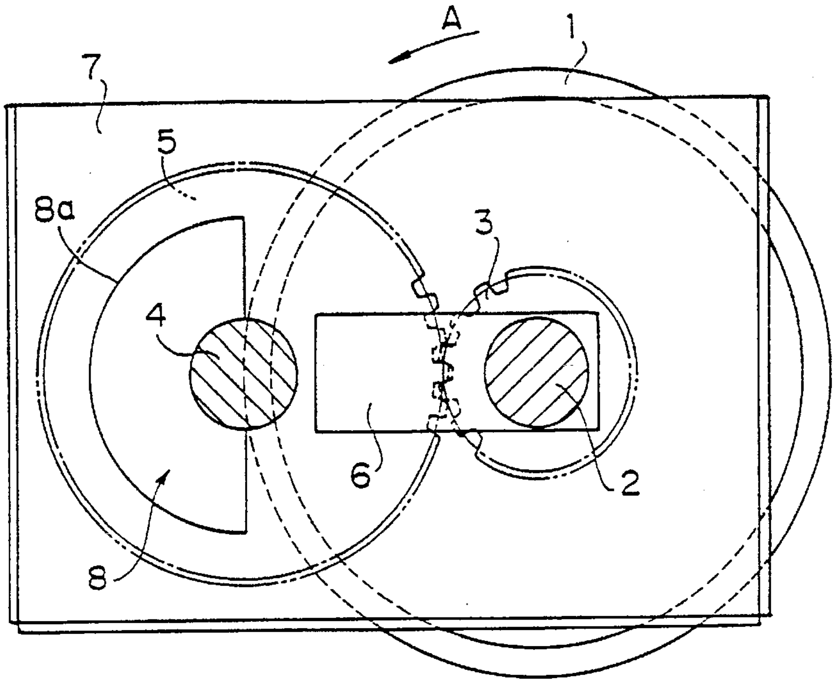
FIG. 2 is a front view of the steering wheel device of FIG. 1 in which steering wheel is in its neutral position.
Figure 3:
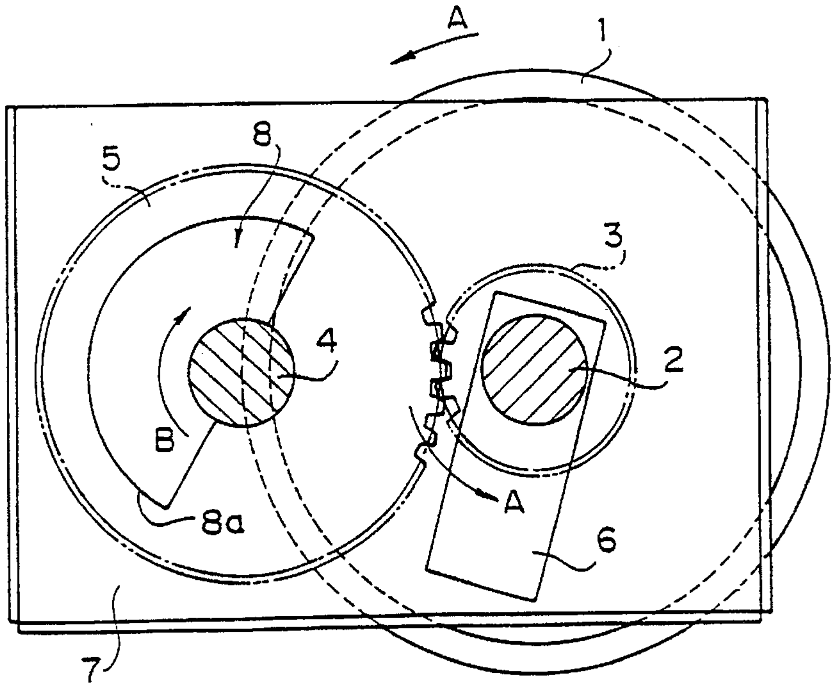
FIG. 3 is a front view of the steering wheel device of FIG. 1 in which the steering wheel rotates.

As the steering wheel device of this embodiment is composed as mentioned above, when the steering wheel 1 is in its neutral position, the stopper arm 6 and the stopper 8 are positioned in a rotation angle of 0 degree as shown in FIG. 2. If the steering wheel 1 rotates from this state in the direction indicated by the arrow A, the first gear wheel 3 and the stopper arm 6 both on the steering wheel shaft 2 rotate with the steering wheel 1 in a body as illustrated in FIG. 3. At this moment, the second gear wheel 5 engaging with the first gear wheel 3 rotates in the opposite direction (indicated by the arrow B) and the stopper 8 rotates therewith as one.

If the steering wheel 1 continues to rotate in the direction A, the stopper arm 6 and the stopper 8 come in contact with each other so as to inhibit further rotation of the steering wheel 1 in the direction A. If the steering wheel 1 is turned from this state to the opposite direction, that is to say, in the direction indicated by the arrow B, the steering wheel 1 passes the neutral point of FIG. 2, makes more than one revolution before reaching the point where the stopper arm 6 and the stopper 8 come in contact with each other again and, at this point, further rotation will be inhibited. The stopper 8 is not arranged all over its rotation locus, namely over a rotation angle of 360 degrees but over only a portion thereof and, in this embodiment, over a rotation angle of approximately 180 degrees, so the steering wheel 1 can make more than one revolution by the stopper arm 6 passing through the range where the stopper 8 is not provided.

When the stopper arm 6 and the stopper 8 come in contact with each other to inhibit further rotation of the steering wheel 1, rotation torque applied to the steering wheel will act only between the stopper 8 and the stopper arm 6 and not between the first gear wheel 3 and the second gear wheel 5. As the result, the load charge onto both gear wheels decreases so as to increase the free degree of their design and their service life.

Additionally, the outer circumferential surface 8*a* of the stopper 8, namely the contact surface with the stopper arm 6, has an arcuate configuration of which center coincides with the auxiliary shaft 4. As a result, the load generated when the stopper 8 and the stopper arm 6 come in contact with each other, namely when the stopper operates, will act in the radial direction of the steering wheel shaft 2 and the auxiliary shaft 4 and will not provoke a rotational force to these shafts. In consequence, no load will be applied to respective gear wheels 3 and 5.

The present invention has been described making reference to one embodiment, it should be understood that the invention is not limited to this embodiment and that various modifications can be made without departing from the technical scope defined in claims.

For example, since the main object of the stopper 8 and the stopper arm 6 is to inhibit rotation of the first gear wheel 3 and the second gear wheel 5 by coming into contact with each other, their configuration is not limited to the one illustrated in FIG. 1 and they may take any other configuration. For instance, while the stopper 8 of the illustrated embodiment is formed as a fan shape of which the center coincides with the auxiliary shaft 4, that is, a configuration having an arcuate circumferential surface of which the center coincides with the rotation central axis line of the second gear wheel 5, it may take a square, circular or other configuration.

Also, the stopper 8 can be placed between the second gear wheel 5 and the framework 7 while the stopper arm 6 can be placed between the first gear wheel 3 and the framework 7. In the aforementioned embodiment, the steering wheel shaft 2 and the auxiliary shaft 4 are connected by means of two gear wheels 3 and 5, but they may also be connected by a set of three or more gear wheels. Alternatively, as power transmission means for connecting the steering wheel shaft 2 and the auxiliary shaft 4, chain, belt or the like can be used in place of the gear wheel.

Figure 6:
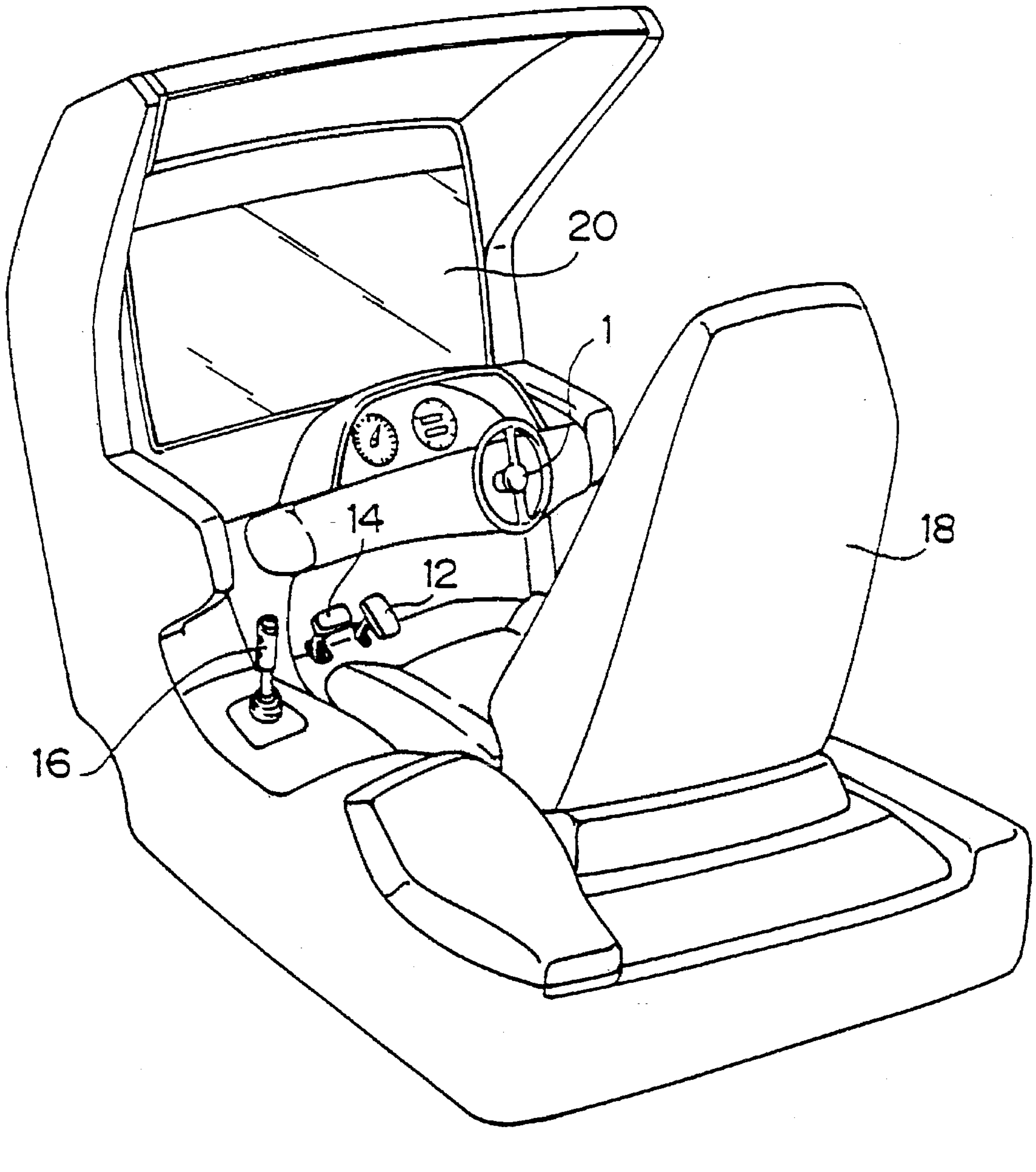
FIG. 6 is a perspective view of an example of driving simulator using the steering wheel device of the present invention.

FIG. 6 illustrates an embodiment in which the steering wheel device according to the present invention is applied to a driving game machine. In this driving game machine, the player drives a racing car on a racecourse or a town course to compete in order or time with a computer car operated by the computer or racing cars driven by other players. The player sits in a seat 18 operates the steering wheel 1 all the way watching a display 20, steps on an accelerator pedal 12 or a brake pedal 14 if necessary and moreover operates a gearshift 16 for playing a game.

Figure 7:
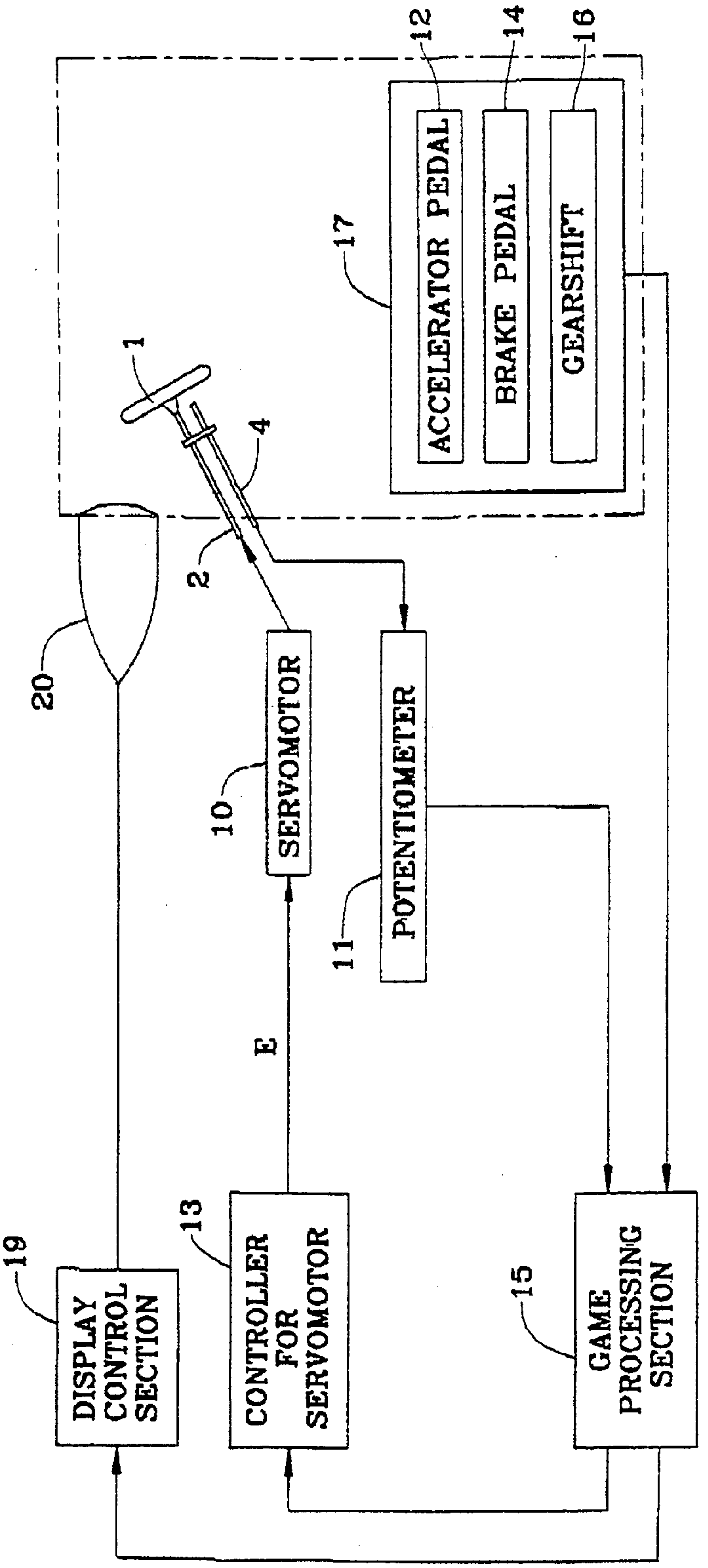
FIG. 7 is a block diagram of an example of electric control system used for such driving simulator.

As illustrated in FIG. 7, for example, such driving game machine has a servomotor 10 connected to the steering wheel shaft 2 and a potentiometer 11 connected to the auxiliary shaft 4. The servomotor 10 applies a load, namely a reaction force, to the steering wheel shaft 2 in proportion to the servo voltage E generated from a servo controller 13. The potentiometer 11 generates a signal according to the rotation angle of the auxiliary shaft 4 and the signal is transferred to a game processing section 15.

The game processing section 15 composed of a computer performs various game processing related to the driving game and controls the driving game according to the operation state of an operation input section 17 comprising an accelerator pedal 12, a brake pedal 14, a gearshift 16 or the like. Its processing results are transferred to a display control section 19 which produces game related image data to be visualized as an image on a display 20. For instance, a forward scene through a windshield of a racing car that is observed by the driver will be represented on a screen of the display 20.

In this driving game machine, the rotation angle of the steering wheel 1 operated by the player is detected by the potentiometer 11 and image data will be processed by the game processing section 15 according to the detection result. The game processing section 15, for instance, computes the driving direction variation and the amount and direction of the reaction force to be transmitted to the steering wheel 1.

INDUSTRIAL APPLICABILITY

The steering wheel device according to the present invention can be advantageously applied to driving simulator, driving game machine or the like.

What is claimed is:

1. A steering wheel device for a driving game machine having a steering wheel, comprising a steering wheel shaft integrated with the steering wheel and connected to a servo motor for applying a reaction force to the steering wheel, an auxiliary shaft arranged separately from the steering wheel shaft and connected to a potentiometer for detecting a rotation angle of the steering wheel, power transmission means interconnecting the steering wheel shaft and the auxiliary shaft such that a rotation angle of the steering wheel shaft is greater than the rotation angle of the auxiliary shaft, a stopper arm mounted on the steering wheel shaft for rotating together with the steering wheel shaft, said stopper arm being arranged separately from the power transmission means, a stopper mounted on the auxiliary shaft for rotating together with the auxiliary shaft, said stopper being disposed opposite the stopper arm and being arranged separately from the power transmission means, said stopper interfering with rotation of the stopper arm after said stopper arm has rotated through at least one rotation.

2. A steering wheel device as claimed in claim 1, wherein a reaction force generated between the stopper arm and the stopper when they come in contact with each other is directed to the rotational center of the auxiliary shaft.

3. A steering wheel device for a driving game machine having a steering wheel, comprising a steering wheel shaft integrated with the steering wheel and connected to a servo motor for applying a reaction force to said steering wheel, an auxiliary shaft separate from the steering wheel shaft and connected to a potentiometer for detecting a rotation angle of the steering wheel, a first gear wheel fixed to the steering wheel shaft, a second gear wheel fixed to the auxiliary shaft and engaging the first gear wheel, said second gear having teeth the number of which is greater than the number of teeth of the first gear wheel, a stopper arm mounted on the steering wheel shaft for rotating together with the steering wheel shaft, the stopper arm being separate from the first gear wheel, a stopper mounted on the auxiliary shaft for rotating together with the auxiliary shaft, said stopper being disposed opposite to the stopper arm and being separate from the second gear wheel, said stopper interfering with rotation of the stopper arm after the stopper arm has rotated through at least one revolution.

4. A steering wheel device as claimed in claim 3, wherein a reaction force generated between the stopper arm and the stopper when they come in contact with each other is directed to the rotation central axis line of the second gear wheel.

5. A steering wheel device as claimed in claim 3, wherein the stopper has an arcuate circumferential face around the rotation central axis line of the second gear wheel which is integrated with the stopper, and the stopper arm is brought in contact with said circumferential surface to thereby stop rotation of the stopper.

* * * * *